United States Patent
Summerfield et al.

(10) Patent No.: US 8,183,868 B2
(45) Date of Patent: May 22, 2012

(54) METHOD TO MAINTAIN TOWED DIPOLE SOURCE ORIENTATION

(75) Inventors: Philip J. Summerfield, Katy, TX (US); Brian J. Fielding, Richmond, TX (US); Larry S. Gale, Dallas, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 485 days.

(21) Appl. No.: 12/306,241

(22) PCT Filed: May 18, 2007

(86) PCT No.: PCT/US2007/012222
§ 371 (c)(1), (2), (4) Date: Oct. 21, 2009

(87) PCT Pub. No.: WO2008/008127
PCT Pub. Date: Jan. 17, 2008

(65) Prior Publication Data
US 2010/0060286 A1   Mar. 11, 2010

Related U.S. Application Data

(60) Provisional application No. 60/830,648, filed on Jul. 13, 2006.

(51) Int. Cl.
*G01V 3/00* (2006.01)
(52) U.S. Cl. .......................................... 324/334; 367/16
(58) Field of Classification Search .................. 324/323, 324/334–337; 367/14–19; 114/242
See application file for complete search history.

(56) References Cited

U.S. PATENT DOCUMENTS

| 3,931,608 A | 1/1976 | Cole |
| 4,157,812 A | 6/1979 | Bennett |
| 4,404,664 A | 9/1983 | Zachariadis |
| 4,547,857 A | 10/1985 | Alexander |
| 4,617,518 A | 10/1986 | Srnka |
| 4,676,183 A | 6/1987 | Conboy |
| 4,745,583 A | 5/1988 | Motal |

(Continued)

FOREIGN PATENT DOCUMENTS

GB   2 404 444   2/2005

(Continued)

OTHER PUBLICATIONS

EP Search Report RS 114213 dated Dec. 1, 2006.

(Continued)

*Primary Examiner* — Arleen M Vazquez
(74) *Attorney, Agent, or Firm* — ExxonMobil Upstream Research Law Dept.

(57) ABSTRACT

Apparatus and method for a steerable horizontal electric dipole source system for underwater deployment as a moving source in electromagnetic surveying of subsurface regions for hydrocarbons. Position locating sensors (195) are placed near each electrode (26, 27), and means (197, 198) are provided for correcting the electrodes to be at the same elevation with azimuth aligned with the source tow line (11) and the electrode mid-point positioned over the source tow line, based on instantaneous location information from the sensors. The streamer (28) connecting the electrodes may also be monitored for shape by sensors, with corrections made by lateral and vertical control means disclosed herein. The invention can be applied to any marine streamer used in geophysical surveys, including a towed streamer (191) of electromagnetic or seismic receivers (192).

35 Claims, 11 Drawing Sheets

U.S. PATENT DOCUMENTS

| | | | |
|---|---|---|---|
| 4,890,568 | A | 1/1990 | Dolengowski |
| 6,131,531 | A | 10/2000 | McCanna et al. |
| 6,236,211 | B1 | 5/2001 | Wynn |
| 6,525,992 | B1 | 2/2003 | Olivier et al. |
| 6,533,627 | B1 | 3/2003 | Ambs |
| 6,879,546 | B2 | 4/2005 | Halvorsen et al. |
| 6,888,623 | B2 | 5/2005 | Clements |
| 6,985,403 | B2 | 1/2006 | Nicholson |
| 7,109,717 | B2 | 9/2006 | Constable |
| 7,132,831 | B2 | 11/2006 | Brabers |
| 7,793,606 | B2 * | 9/2010 | Olivier et al. .......... 114/245 |
| 7,881,152 | B2 * | 2/2011 | Storteig et al. .......... 367/16 |
| 2004/0108854 | A1 | 6/2004 | Nichols |
| 2005/0276161 | A1 | 12/2005 | Olivier |

FOREIGN PATENT DOCUMENTS

| | | |
|---|---|---|
| WO | WO 98/28636 | 7/1998 |
| WO | WO 02/103393 | 12/2002 |
| WO | WO 2005/006022 | 1/2005 |
| WO | WO 2005/081719 | 9/2005 |

OTHER PUBLICATIONS

PCT International Search & Written Opinion dated May 8, 2008, 8 pages.

Adamson, J.E. (2003), "Efficient Heave Motion Compensaton for Cable-Suspended Systems," Oceanworks International, Inc., www.oceanworks.cc/whatsnew/paper.html.

Chave, A.D. et al. (1991) "Electromagnetic Exploration Methods for the Seafloor, (ed. M.N. Nabighian)," *Society of Exploration Geophysicists*, Chapter 12, pp. 931-966.

Constable, S. et al. (1996), "Marine controlled-source electromagnetic sounding 2. The PEGASUS experiment," *J. Geophs. Res.* 101, pp. 5519-5530.

Eidesmo, T. et al. (2002), "Sea Bed Logging (SBL), a new method for remote and direct identification of hydrocarbon filled layers in deepwater areas," *First Break* 20.3, pp. 144-152.

Ellingsrud, S. et al. (2002), "Remote sensing of hydrocarbon layers by seabed logging (SBL): Results from a cruise offshore Angola," *The Leading Edge*, pp. 972-982.

Koterayama, W. et al. (1988) "Motions of a Depth Controllable Towed Vehicle," *The Seventh International Conference on Offshore Mechanics and Arctic Engineering*, Houston, Texas, pp. 423-430.

Macgregor, L. et al. (2001), Electrical resistivity structure of the Value Fa Ridge, Lau Basin, from marine controlled-source electromagnetic sounding, *Geography J. Int.* 146, pp. 217-236.

Schulz, et al. (2001) "Long Gage Fiber Optic Bragg Grating Strain Sensors to Monitor Civil Structure," *Proceedings, SPIE 4330*, Smart Structures and Materials 2001: Smart Systems for Bridges, Structures, and Highways, pp. 56-65.

Wu, J. et al. (1997) "3-D Simulation of a Two-Part Underwater Towed System," *7th International Offshore and Polar Engineering Conference*, Honolulu, Hawaii, pp. 44-50.

* cited by examiner

METHOD TO MAINTAIN TOWED DIPOLE SOURCE ORIENTATION

This application is a National Stage entry under 35 U.S.C. 371 of PCT/US2007/012222 that published as WO 2008/008127 and was filed on May 18, 2007 and claims the benefit of now expired U.S. Provisional application 60/830,648 which was filed on Jul. 13, 2006.

FIELD OF THE INVENTION

This invention relates generally to the field of geophysical prospecting and, more particularly, to controlled-source electromagnetic ("CSEM") surveys for geophysical applications. Specifically, the invention is a method for maintaining a source dipole (or a towed streamer equipped with in-line receiver dipoles) in a horizontal plane and along a pre-defined tow azimuth as the submerged dipole is towed through the water in a marine CSEM survey.

BACKGROUND OF THE INVENTION

The marine CSEM exploration method uses a man-made source to generate electromagnetic ("EM") waves and deploys receivers on the seafloor to record EM signals. The recorded EM signals are analyzed to infer sub-seafloor structures and/or determine the nature of particular structures, such as reservoirs. FIG. 1 shows the principle of marine CSEM exploration with a Horizontal Electric Dipole (HED) source 12. A tow cable (and control umbilical) 11 pulls the source through the water. Autonomous receivers 13 are located on the sea floor 14 along or near the source tow line (not shown in FIG. 1 but see 33 in FIG. 3). This technology has been applied in tectonic studies, hydrocarbon and mineral exploration, environmental and geological engineering (Chave, et al., in *Electromagnetic Methods in Applied Geophysics* (ed. M. N. Nabighian), Vol. 2, 931-966, Society of Exploration Geophysicists (1991); Constable and Cox, *J. Geophs. Res.* 101, 5519-5530 (1996); MacGregor, et al., *Geophy. J. Int.* 146, 217-236 (2001); Ellingsrud, et al., *The Leading Edge*, 972-982 (2002); and Eidesmo, et al., *First Break* 20.3, 144-152 (2002)).

To date, marine CSEM applications involve towing an HED above the seafloor at a slow constant velocity. Typical altitudes (above the seafloor) range between 25 and 75 meters, depending on the length of the dipole and seafloor topography. Typical tow velocities range between 1.0 and 2.0 knots. It is desirable for a marine CSEM source HED to remain:

Horizontal (i.e. the "pitch" angle 21 between the head-tail electrode chord 22 and the horizontal 23, as illustrated in the vertical profile view of FIG. 2, should be small);

Positioned over the pre-plot line (the planned path of the source; it should be noted that the surface vessel will typically not follow the tow line due to surface currents, wind or seafloor bottom currents); and At the same azimuth as the pre-plot sail line (i.e. the "yaw" angle 31 between the head-tail electrode chord 32 and the pre-plot sail line azimuth 33, as illustrated in the top or plan view of FIG. 3 should be small).

Satisfying these criteria will ensure the maximum transmitted EM energy associated with the horizontal component of the source dipole moment in the desired orientation and zero or negligible transmitted EM energy associated with the across-line 41 and vertical 42 dipole moment components, as illustrated in FIG. 4. (The source dipole moment is a vector equal to dipole length vector multiplied by the transmitted current.) Ideally, the dipole moment would be aligned with the in-line axis (in a horizontal plane, along the pre-plot sail line azimuth). In practice, the source dipole moment 40 will deviate from the preferred direction 44, but the objective is that the in-line component 43 should be as large as possible. The effect of dipole yaw and pitch on transmitted EM signal components are illustrated in FIGS. 17A-B and 18A-B, respectively. FIGS. 17B and 18B illustrate the reduction (percentage of the ideal dipole moment) in the in-line horizontal transmitted EM energy with yaw angle (17B) and pitch angle (18B). FIGS. 17A and 18A show the introduction of transmitted EM energy in an orthogonal component based on a yaw (17A) or pitch (18A) angle. The reduction in the horizontal component may be considered minimal (approximately 13% for a deviation of 30 degrees), the orthogonal component becomes significant (50% for a deviation of 30 degrees). Further, as can be seen from FIGS. 17A and 18A, the deviation in the orthogonal component changes with the direction of the deviation. Any EM signals transmitted in the across-line or vertical components can result in incomplete parametric data processing and interpretation. This follows because the modeling assumes a perfectly aligned dipole. Any vertical response is assumed to be due to the sub-structure. Any vertical dipole moment can contaminate or even mask the predicted response.

Current marine CSEM sources include the following general design features (please refer to FIGS. 2, 3), which are collectively referred to as a "source dipole":

A "tail drogue" 24, which provides a limited amount of drag to ensure the dipole streams behind the "head fish" 25. The tail drogue may include positioning sensors and is equipped with sufficient flotation to ensure neutral buoyancy.

Head 26 and tail 27 electrodes, which are typically constructed from aluminum or copper. The electrodes are sized (in diameter, length and surface area) to ensure optimal transfer of the EM signal to the surrounding seawater.

A streamer 28, consisting of an electrical conductor(s) which transmits current from the head fish to the electrodes. Generic tethers that may be customized into marine CSEM streamers may be purchased from, for example, South Bay Cable Corporation (www.southbaycable.com). Flotation, either built into the streamer core and/or attached externally, ensures the entire streamer is neutrally buoyant.

A "head fish" 25, which contains the sub sea high power electrical transformer and control electronics ("waveform source"). The head fish is towed by the tow umbilical 11 and in turn tows the "head" and "tail" electrodes, streamer and "tail drogue". The head fish is very heavy (2,000 lbs or greater) compared to the other elements of the CSEM source.

The marine CSEM source is "flown" to maintain a constant head fish altitude above the seafloor. An operator on the surface survey vessel will "pay-out" or "reel-in" umbilical cable to maintain the desired altitude. The umbilical cable 11 will not follow a straight line chord between the surface vessel's "A-frame" and the head fish due to the effects of the cable drag 53 and the weight 54 of the cable, and the drag 55 and weight 56 of the head fish, as illustrated in FIG. 5. The drag forces are a function of speed. Vector 57, representing the tow force exerted by the vessel, completes the force diagram.

In FIGS. 6 and 7, modeled responses of the umbilical catenary illustrate the changes in head fish position (layback distance and depth) due to changes in the umbilical length (FIG. 6) and surface vessel speed (FIG. 7). Both the depth and layback distance of the head fish will change if the umbilical length or vessel speed change. The primary result of a change in the umbilical length will be a change in depth, with a smaller change in layback distance (FIG. 6). The primary result of a change in tow speed will be a change in layback distance, with a smaller change in depth (FIG. 7).

FIG. 6 illustrates the catenary present in the umbilical. The plotted circles represent an umbilical of length 2,900 m; the triangles represent an umbilical of length 3,000 m; and the squares represent an umbilical of length 3,100 m. The variation in umbilical length (100 m) is greater than the resultant depth change of the head fish (91.9 m). A tow vessel speed of 1.0 knot was used for the simulations of FIG. 6.

FIG. 7 illustrates the change in head fish depth as a function of surface vessel speed for an umbilical length of 3,000 m. The plotted circles represent a tow speed of 0.95 knot, the triangles 1.00 knot, and the squares 1.05 knots. The depth differences are shown on the drawing.

The head fish will respond to changes in surface vessel speed or umbilical length quickly due to the associated vertical forces (upward force through the umbilical or gravity on the very heavy head fish). The streamer is designed to be neutrally buoyant and the main force acting on the streamer is the tow force from the head fish. The tow force is nominally horizontal in direction, with slight deviations from the horizontal when the head fish's altitude changes (due to changes in umbilical length or tow surface vessel speed). The neutrally buoyant streamer will exhibit a damped response to changes in the head fish altitude, which will result in a source dipole pitch angle (FIG. 2).

The surface vessel will "heave" up and down due to both wind and swell generated wave action. The head fish, coupled directly to the vessel's stern through the umbilical, will oscillate with the ship's motion. The amplitude and phase of the head fish oscillations relative to the vessel's motion will depend mostly on the length of umbilical paid out. Other factors affecting response characteristics are vessel oscillation frequency, vessel speed, sea currents, head fish mass, and umbilical physical properties (e.g., mass, diameter, and drag). The umbilical will act like a spring as the vessel oscillates at the sea surface, both due to the umbilical's physical properties and the catenary shape of the umbilical through the water column. This "spring" constant will change as the previously stated factors change. As a general case, the oscillation amplitude of the head fish relative to the vessel decreases as the umbilical cable length increases. Based on the previous discussions, heave induced vertical motion of the head fish will generate variable pitch angles in the marine CSEM source dipole.

The streamer is subject to the following three forces:
1. The tow force through the tow umbilical and head fish,
2. A drag force 82 (see FIG. 8) from sub-sea components being towed through the water,
3. Any seafloor bottom current. FIG. 8 illustrates the effect of a broadside current 81 on the streamer 28 and the resultant yaw angle 31. The magnitude of the yaw angle will be dependent on the seafloor bottom current vector 81 (magnitude and direction).

The presence of a yaw angle will result in an across-line component of the source dipole moment (41 in FIG. 4). A non-zero across-line source component can result in incomplete parametric data processing and interpretation.

Heave Compensation

Several different approaches have been adopted to attenuate or eliminate the affect of surface vessel heave on towed sub-sea vehicles, including:

I. Heave Motion Compensation Winch (141 in FIG. 13) Systems

Adamson (see "Efficient Heave Motion Compensation for Cable-Suspended Systems," Oceanworks International, Inc, 1646 West Sam Houston Parkway N., Houston, Tex. 77043 (http://www.oceanworks.cc/whatsnew/paper.html)) describes three methods of compensation, which all lengthen or shorten the tow umbilical in unison with the vertical motion of the tow point on the surface vessel (for marine CSEM operations the tow point is the sheave 142 typically mounted on an 'A' frame 143 (FIG. 13) or other means of supporting the sheave such as a boom):

(i) Active compensation: Alternately paying out and taking up on the lifting winch 141 directly.

(ii) Active compensation: Moving the over-boarding sheave 142 at the end of the boom (or A-frame) up and down.

(iii) Passive compensation: Alternately stoking in and out idler sheaves (not shown) over which the lifting wire repeatedly passes.

The active techniques can achieve precise compensation but require more topside power, are technically and mechanically complex, are costly to install and maintain, and increase the number of repetitive cycles on the primary lifting device, which can reduce the mean time to failure.

II. Flying Wing Systems

Koterayama, et al. ("Motions of a Depth Controllable Towed Vehicle," *The Seventh International Conference on Offshore Mechanics and Arctic Engineering*, Houston, Tex. (1988)) model a deep tow vehicle carrying CTD (Conductivity, Temperature and Depth) and ADCP (Acoustic Doppler Current Profiler) packages, which require stable depth and pitch/roll respectively. The deep tow vehicle was designed with wings and horizontal tails complete with feedback control. Static calculations and dynamic scale experiments demonstrate the wings and tail can control the operational depth and roll stability. The deep tow vehicle's pitch stability can be managed through the appropriate selection of the tow point. The authors conclude, "it has been demonstrated that the towed vehicle can not keep constant submerged depth without control of the wing when it is towed by the ship oscillating in waves [i.e., heave]. The attitude and submerged depth of the towed vehicle are very stable when it is under control [of the wing]."

III. Separate Depressor Systems

Wu and Chwang ("3-D Simulation of a Two-Part Underwater Towed System," 1997 *7th International Offshore and Polar Engineering Conference*, Honolulu) discuss several numerical methods to dynamically model a two part deep tow system, which includes a depressor weight 144 attached to the umbilical 11 and the deep tow vehicle 145 towed by a secondary cable 146 attached to the primary umbilical (FIG. 13). Simulations illustrate the heave of the towed vehicle is attenuated as:

(i) The surface wave period decreases, and
(ii) The length of the secondary cable increases.

The authors conclude, "the results of numerical simulations indicate that the two-part tow method improves the behavior of the towed vehicle in vertical plane motions (heave and pitch), but no great difference is observed between the horizontal movements (surge and sway) of the towed vehicle and those of the depressor."

Buoyancy Control

EM survey contractors have attempted to control the pitch of the marine CSEM source dipole towed in a steady state by constructing neutrally buoyant streamers. The choice of hardware and their limitations are discussed next.

Flotation devices have been used in offshore and sub-sea activities for a number of years. Typical applications include:

(i) Sub-sea operations (including moorings and pipelines);
(ii) Seismic data acquisition (including cable floats);

(iii) Oceanographic data acquisition (including ADCP (Acoustic Doppler Current Profiler) floats); and (iv) ROV/AUV applications (including buoyancy) [ROV: Remotely Operated Vehicles, AUV: Autonomous Undersea Vehicles].

There are several different types of foam available for use in these flotation devices, including polyurethane, co-polymer and syntactic. Syntactic foam has the largest operational depth range and is normally selected for deep water applications (3,000 to 6,000 meters). Syntactic foams are low density composite materials which consist of miniature hollow glass spheres (10 to 300 microns in diameter) encased in a binding resin or polymer. The base polymer is chosen for a specific application (including operational depth and expected life). The glass spheres are added to reduce the specific gravity of the foam and increase the buoyancy.

Foam-based flotation devices are designed to provide minimum buoyancy for a given application over a specified depth range. Typical applications for foam floatation include:
  (i) Provide buoyancy for ROVs,
  (ii) Keep a cable or buoy at the sea surface,
  (iii) Keep a tethered acoustic transponder off the seafloor, and
  (iv) Provide sufficient buoyancy to return a device to the sea surface after release from a seafloor "clump weight" or anchor.

Foam will compress with increasing pressure, which will reduce the available buoyancy. Syntactic foams are designed with very small compression ratios (typically ≦1.0% at operational depth). This reduction in buoyancy does not affect these normal applications. However, this small second order effect of buoyancy variation with water depth results in syntactic foam being a useful flotation medium for a marine CSEM source streamer, but not a complete solution. The flotation requirements for a marine CSEM source must cover all operational water depths (100 to 3,500+ meters). Commercial CSEM streamers are manufactured with a center core of strength members and electrical conductors surrounded by a foam collar. The design will yield a streamer that is nominally neutrally buoyant, but will not be neutrally buoyant over the entire operational water depth range.

Kerosene (a buoyant non-electrically conductive fluid) has also been used as a buoyancy medium in marine seismic streamers. The advantages of kerosene are:
  (i) Availability;
  (ii) Low cost (compared to foam); and
  (iii) Essentially incompressible (retains buoyancy over CSEM operational range).

U.S. Pat. No. 6,879,546 to Halvorsen, et al. lists disadvantages associated with kerosene-filled streamers:
  (i) "Fluid-filled streamer cables suffer from a number of significant problems. The outer jacket is typically only a few millimeters thick and thus, is, easily penetrated by shark bites or other physical hazards encountered during towing, storage and deployment. Moreover, fluid-filled streamer cables are normally spooled onto large drums for storage on the vessels and often rupture during winding (spooling) and unwinding operations."
  (ii) "Seismic survey companies spend large amounts of money in repairing such cables and are typically forced to keep excessive inventory of such cables as spares for damaged cables. Outer jacket ruptures during surveying operations can require shut down of the surveying operations. Such down time can be very expensive due to the large capital cost of the vessels and the lost time of the crew, which can be several thousand dollars per hour."
  (iii) "Additionally, kerosene typically used in fluid filled streamers is toxic and highly flammable, which creates safety, health and environmental (SHE) problems. Moreover, streamer filler fluid leaking into the ocean is hazardous to marine life."

The outer jacket of a marine seismic streamer is thin to enhance the coupling of the embedded hydrophone with the surrounding sea water. Marine CSEM source streamers consisting solely of strength members and electrical conductors do not have the coupling issues associated with marine seismic streamers. Therefore outer jackets can be sufficiently thick and/or fabricated from a robust material to minimize jacket ruptures, but the resultant streamer must remain sufficiently flexible to be stored on a deck reel. While the small diameter and short length of CSEM streamers, relative to a typical (non-solid core) seismic streamer, reduces the volume of Kerosene stored on the vessel and deployed in the ocean, the toxic and fire hazards still exist.

Fielding and Lu disclose methods, including the use of thrusters and increased drag, for maintaining a vertical electric dipole in a vertical posture while being towed below the water surface, in PCT Patent Publication WO/2005/081719.

SUMMARY OF THE INVENTION

In one embodiment, the invention is a steerable horizontal electric dipole source system for underwater deployment as a moving source in electromagnetic surveying of subsurface regions for hydrocarbons, comprising:

(a) a head electrode and a tail electrode, connected by a flexible streamer to form a dipole, said head electrode being adapted to connect to a tow cable, said electrodes being made of an electrically conducting material;

(b) a first lateral control means for changing position of the head electrode in a lateral (horizontal) plane when the source is submerged in water;

(c) a vertical control means adapted to decouple the head electrode from tow cable force variations when the source is submerged in water;

(d) a position-locating sensor located near the head electrode, adapted to determine instantaneous position of the head electrode; and (e) control electronics and electrical connections between the position-locating sensor and the first lateral control means, such that the control means are adjustable in real time based on the instantaneous position of the head electrode.

In some embodiments of the invention, a second lateral control means and an associated position-locating sensor are deployed at the tail electrode. In some embodiments, the streamer includes a plurality of position-locating sensors distributed along its length, and lateral control means for generating lateral forces in water to control the streamer's shape when submerged in water. More generally, the invention can be applied to control the position and orientation of any marine streamer used in geophysical surveys, including a towed streamer of electromagnetic or seismic receivers. A primary application of the invention is as an early step in producing hydrocarbons (oil or gas) from a sub-sea formation.

BRIEF DESCRIPTION OF THE DRAWINGS

The present invention and its advantages will be better understood by referring to the following detailed description and the attached drawings in which.

The same reference numbers may be used in different drawings to refer to similar features.

Figure 1:
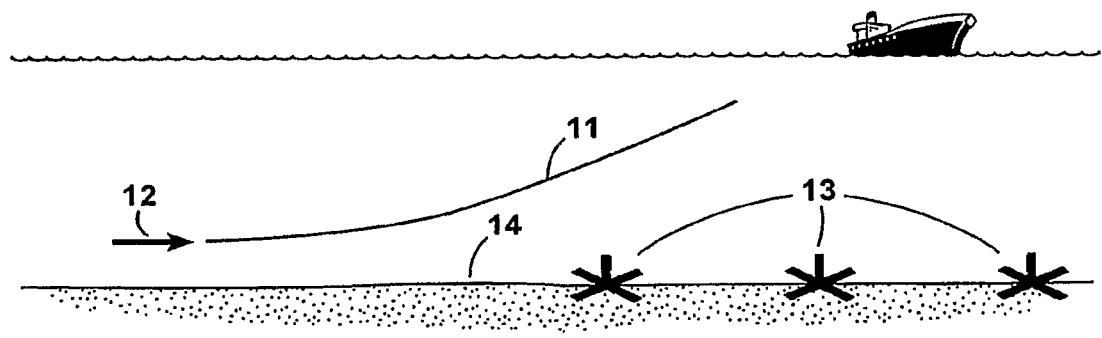
FIG. 1 is a schematic representation (not to scale) of a marine CSEM survey using an HED source.
Figure 2:
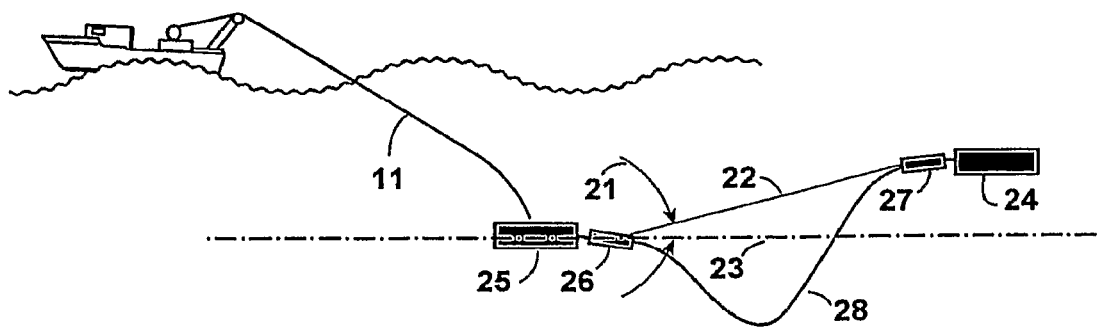
FIG. 2 defines the pitch angle of a dipole source being towed by a vessel in a choppy sea (not to scale)
Figure 3:
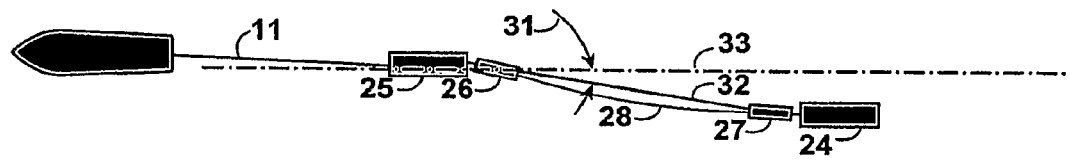
FIG. 3 defines the dipole yaw angle (not to scale)
Figure 4:
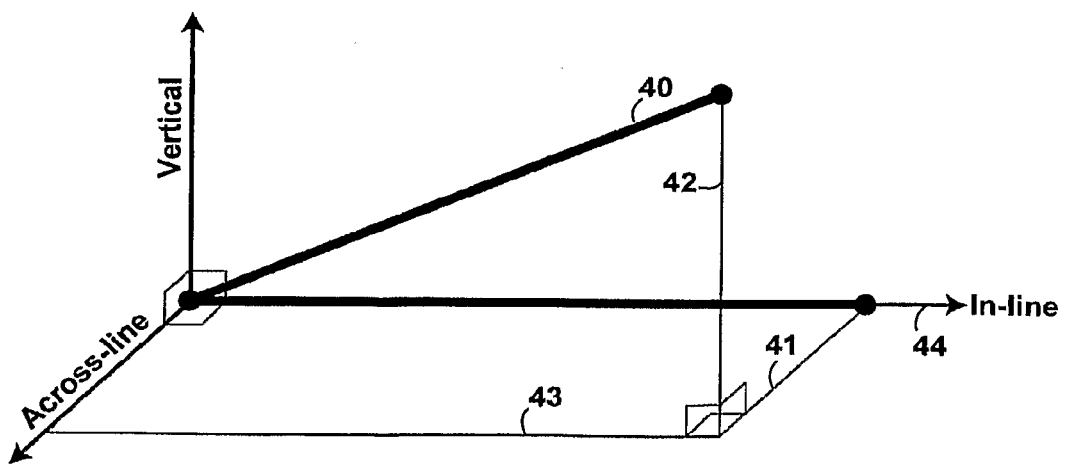
FIG. 4 illustrates the in-line, across-line, and vertical components of a source dipole moment vector when not aligned with the pre-plot sail line azimuth.
Figure 5:
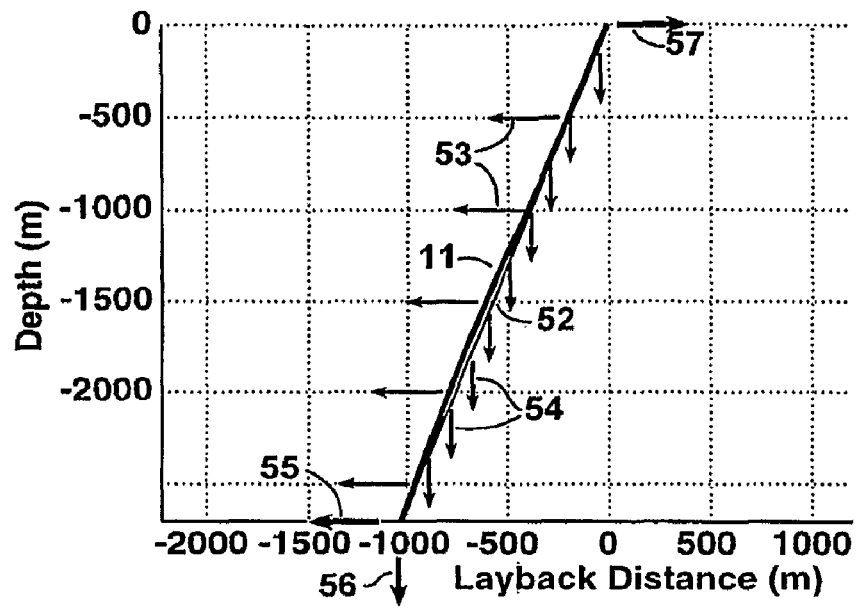
FIG. 5 is a force diagram for an umbilical tow cable.
Figure 6:
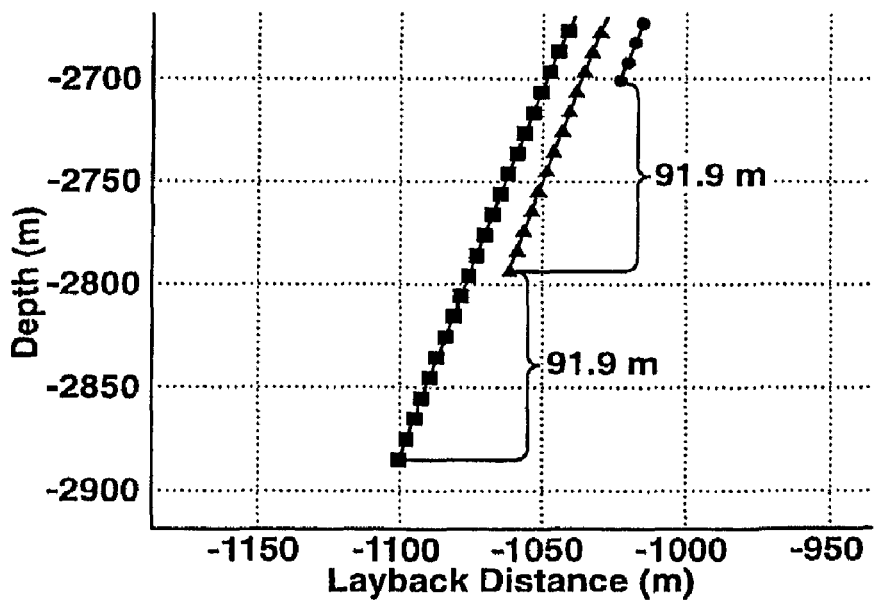
FIG. 6 shows change in head fish altitude (and a change in layback distance as a secondary effect) as a function of length of the tow umbilical, based on a synthetic data model calculation.
Figure 7:
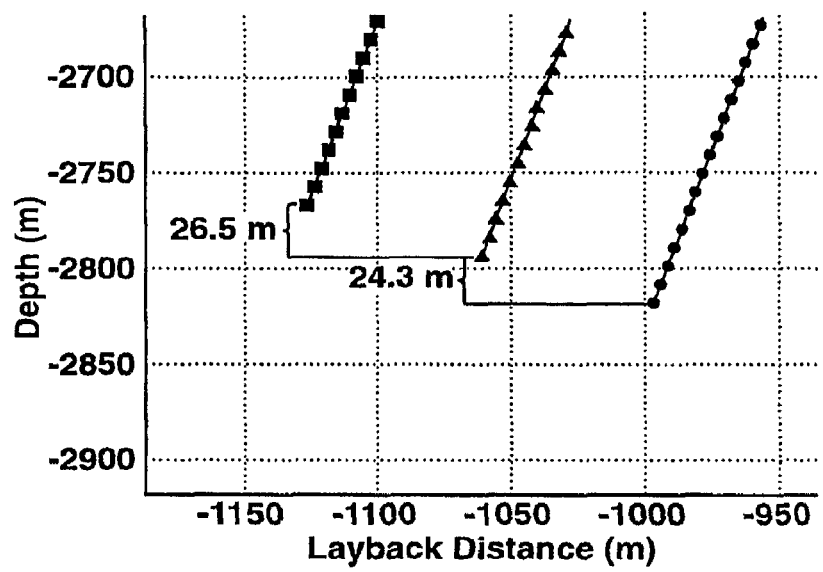
FIG. 7 shows change in layback distance (and a change in head fish altitude as a secondary effect) as a function of tow vessel speed, based on a synthetic data model calculation.
Figure 8:
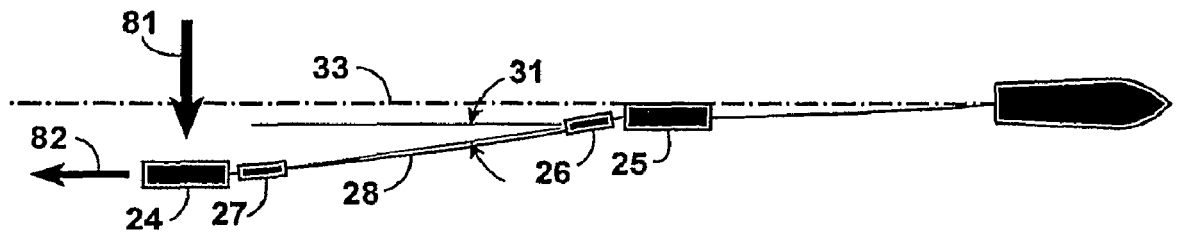
FIG. 8 illustrates a yaw angle caused by a seafloor bottom current (not to scale)

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a steerable marine CSEM source dipole for maintaining neutral pitch and yaw when towed notwithstanding vessel heave, variations in seafloor topography, and sea-bottom cross currents. Various embodiments of the invention can comprise some or all of the features in the following partial list:

means for supplying electrical power to a controllable "waveform source". The "waveform source" is controlled to produce a desired time-varying electrical current between its outputs;

means for moving the "waveform source" through the ocean. This may be the same mechanical apparatus that supplies power to the "waveform source";

neutrally buoyant cables attaching the "waveform source" outputs to two electrodes, one ("far") electrode being significantly farther away from the power source than the other ("near") electrode;

both electrodes being electrically conductive and capable of conducting current into the water and sediments;

a depressor weight or equivalent to de-couple the "head fish" from surface vessel heave motion;

heave compensation on the surface vessel (either active or passive) to attenuate the effect of any vertical heave of the surface vessel on the "head fish;"

a "head fish" equipped with a thruster or control vane to maintain its vertical position in the presence of vertical heave of the surface vessel.

a "head fish" with self-contained horizontal propulsive means;

a streamer that can limit horizontal lateral motion, by explicit design (e.g., elliptical cross section) or self-contained propulsive means (e.g., thrusters or control vanes);

a streamer that can change its vertical position while deployed using control signals generated autonomously or from the surface vessel;

a "tail drogue" with self-contained horizontal propulsive means;

a "tail drogue" that can change its vertical position while deployed using control signals generated autonomously or from the surface vessel; and, means of determining the locations of the "near" and "far" electrodes.

Such a steerable transmitter can then be:

towed in elevated sea states where the surface vessel's heave is de-coupled from the "head fish";

deployed as a horizontal dipole as the head fish maintains a constant altitude above the seafloor during varying seafloor topography; and, towed along a pre-plot sail line azimuth even in the presence of seafloor bottom currents.

In use, the steerable source is preferably towed at a constant altitude above the seafloor that maximizes the coupling of the transmitted signal to the seafloor while providing an acceptable safety margin against collision with the seafloor or existing infrastructure. The source is towed at a speed that maximizes spatial resolution and signal-to-noise ratio while being operationally efficient. The transmitted data are acquired using seafloor receivers, processed, and analyzed for the presence of resistive geologic structures, such as hydrocarbon reservoirs.

Several conceptual designs have been presented in patent documentation (patent publications and applications) where the autonomous sea-floor receivers have been replaced by receivers built into a towed streamer. U.S. Pat. No. 4,617,518 to Srnka presents the method of towing a streamer equipped with electric field sensors behind a marine CSEM source. Johnstad (World International Patent Publication WO2005/006002) and Nichols (U.S. Patent Application Publication No. 2004/0108854) discuss streamers equipped with both seismic and electromagnetic sensors.

Figure 19:
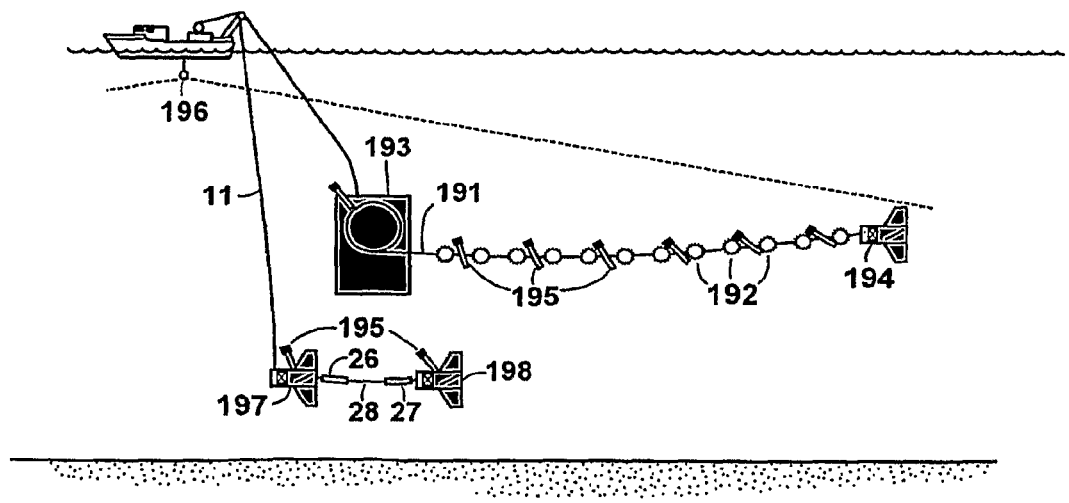
FIG. 19 is a schematic vertical profile of a source dipole and towed receiver streamer with absolute positions estimated by a single low frequency USBL system (not to scale)

A source dipole and a streamer equipped with in-line receiver dipoles are conceptually very similar, with the significant difference being the relative scale; a source dipole is typically 100 to 300 meters in length, while a towed streamer would range between 5,000 and 10,000+ meters. FIG. 19 illustrates a vessel towing both a source dipole streamer 28 and a receiver streamer 191 with spaced electric field sensors 192. Both streamers have common physical requirements; both will be towed at constant, but different, depths (i.e. remain horizontal) and must follow the same pre-plot sail azimuth. The invention is equally applicable to either streamer application. (Similar considerations apply to a streamer of seismic hydrophones or geophones.) A CSEM receiver streamer needs means for supplying electrical power to amplifiers connected to in-line electric dipoles with suitable electrodes (silver silver-chloride, carbon fiber or equivalent) to receive the time-varying signals transmitted from the "source waveform". The amplifiers may be situated at any convenient location, including in the streamer, at the end of the streamer or on the surface vessel. The description that follows explains the invention mostly in terms of source embodiments, but this is for illustrative purposes only.

A steerable source according to the present invention may include one or more of the following four features:

(1) Lateral control of the dipole end points;
(2) Lateral streamer control;
(3) Vertical control of the head fish and tail drogue; and
(4) Vertical streamer control.

where control means active capability to move in a specified direction or, in the vertical dimension, capability to decouple from tow vessel heave. Of the four features identified above, the most important are lateral control of the dipole end points and vertical control of the head fish. The active control aspects of the present invention are in contrast to known methods in which:

(i) Streamer buoyancy is addressed through passive methods of adding/removing flotation to achieve a nominally neutral vertical profile. (These methods cannot fully compensate for buoyancy variations along a pre-plot line due to depth variations.)

(ii) Head fish and tail drogue stability is addressed through the deployment of passive fins or vanes. Such fins or vanes can be used in conjunction with the present invention to provide a more stable platform which, in turn, enhances the performance of sensors (e.g., acoustic transponders and altimeters) mounted on them.

Lateral Control of the Dipole End Points

The present invention includes several alternatives for controlling the horizontal (lateral) profile of the marine CSEM source streamer. Someone skilled in either the art of sub-sea engineering or vehicle dynamics can design any of these approaches or an optimal combination of some or all of them.

I. Increased Tow Force or Drag Force.

The streamer is subject to three horizontal forces:

(i) Tow force from the head unit ("fish") through the tow umbilical
(ii) Drag force from the source dipole components and tail unit ("drogue")
(iii) Seafloor bottom current. The streamer will yaw whenever the seafloor bottom current is not parallel to the source dipole's tow direction.

The various forces can be vector summed to estimate the yaw angle. Increasing either of the inline forces (tow or drag) will minimize the influence of the seafloor bottom current and the resultant yaw angle. For example, the horizontal drag force can be increased by deploying a kite device behind the tail drogue. This approach requires careful design consideration in the following areas:

(i) Increasing the tow speed will cause the CSEM source to "kite" above the seafloor, i.e. its altitude above the seafloor will increase. Paying-out additional umbilical will return the CSEM source to its nominal altitude, however the distance between the surface vessel and CSEM source (layback) will increase as will position uncertainties.

(ii) Increasing the drag will increase the tensile forces within the entire subsea assembly and associated topside components. These increased forces can be overcome through appropriate engineering and design. The CSEM source is typically designed with "weak links" which fail if the source becomes caught on the seafloor or existing infrastructure. The failure limits of such weak links would need to be increased to overcome the higher nominal tensile forces. Overcoming the higher nominal tensile forces, through increased weak link failure limits, also increases the potential for significant damage to either the CSEM source or infrastructure if the two collide.

All of the methods and techniques described in this and subsequent sections for controlling the lateral and vertical positions of the streamer and its end points rely on real-time feedback control loops. In each case, the profile must be estimated in real-time, which will enable a corrective force to be applied to return the 'object' back to its desired state (including lateral position or azimuth and vertical depth).

The real-time positions must be estimated to sufficient precision to control the feedback mechanism. There are several methods by which the real-time positions and feedback mechanism interact. These methods differ in complexity and cost and will satisfy different requirements:

(A) Manual feedback. An operator on the surface vessel can adjust control devices remotely, through umbilical communications and electric or hydraulic actuators, based on the real-time position estimates. This technique is suitable for bodies that require infrequent corrections or adjustments. One example could be the vertical control of a towed streamer in calm sea-states (minimal heave), a flat sea-floor topography and a well balanced neutrally buoyant streamer.

(B) Automatic feedback. The control devices can be adjusted automatically based on the real-time estimates. The computations required to estimate the corrective forces can be performed at any convenient location (including the surface vessel or head fish). One example would be the vertical control of the tail drogue in an area of severe or frequent seafloor topographic variation.

II. Thrusters.

Thrusters are used to maneuver ROVs. Commercial thrusters capable of generating >100 lbs thrust and rated to 6,000 meters are available. For example: (1) CTE-02 thruster (100 lbs forward thrust and fill ocean depth rated) marketed by Sub-Atlantic Ltd., Unit 12, Airways Industrial Estate, Pitmedden Road, Dyce, Aberdeen, AB21 0DT, Scotland, UK; and (2) Tecnadyne Model 2010 thruster (205 lb forward thrust and full ocean depth rated) marketed by Tecnadyne, 14627 Calle Diegueno, P.O. Box 676086, Rancho Santa Fe, Calif., 92067, USA. A 300 m long, 45 mm diameter streamer being towed at 1 knot, with a 2 knot cross current will require approximately 600 lbs of lateral thrust to bring the tail drogue back to the pre-plot survey line. Tail drogue mounted thrusters, interfaced to power and communications through the tow umbilical and streamer can be mounted in a rigid configuration providing a lateral force only. An alternative configuration would enable the thrusters to be rotated by actuators to provide a combination of lateral force and increased drag.

III. Control Vanes.

Figures 15, 16:
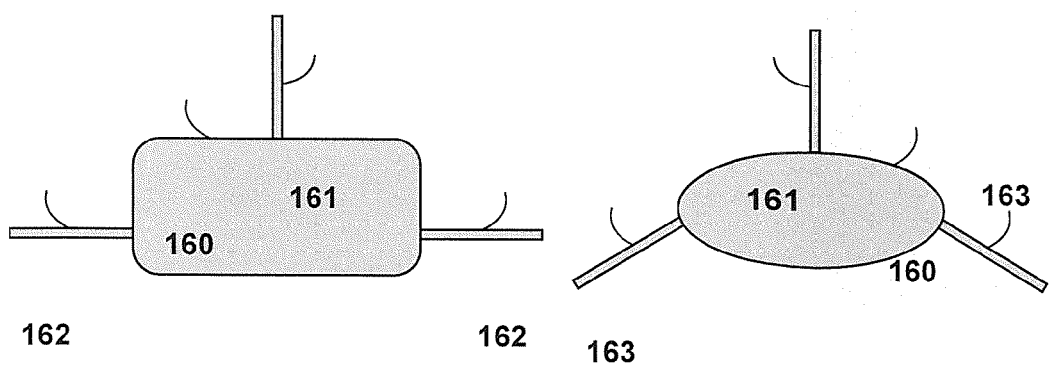
FIGS. 15 and 16 are schematic vertical cross sections of towed bodies with different vane configurations (not to scale)
Figure 17A:
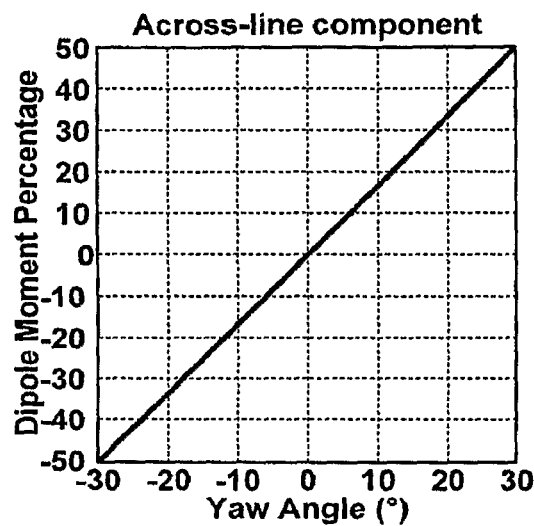
FIGS. 17A-B show across-line (17A) and in-line (17B) dipole moment components for a range of yaw angles, as a percentage of the ideal dipole moment.
Figure 17B:
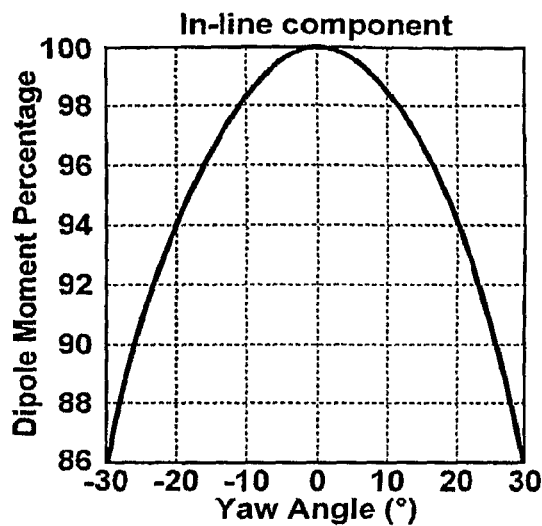
Figure 18A:
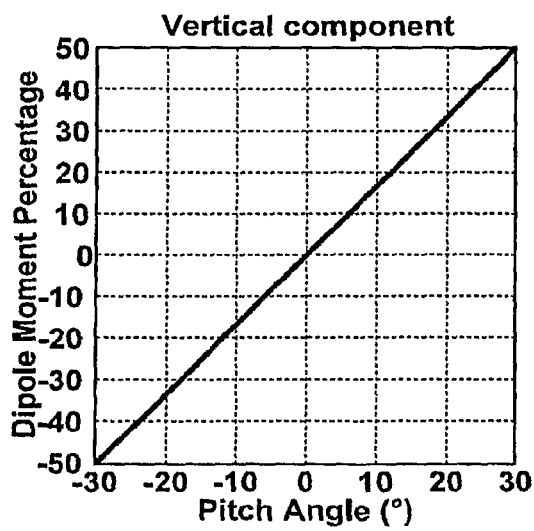
FIGS. 18A-B show vertical (18A) and in-line (18B) dipole moment components for a range of pitch angles, as a percentage of the ideal dipole moment.
Figure 18B:
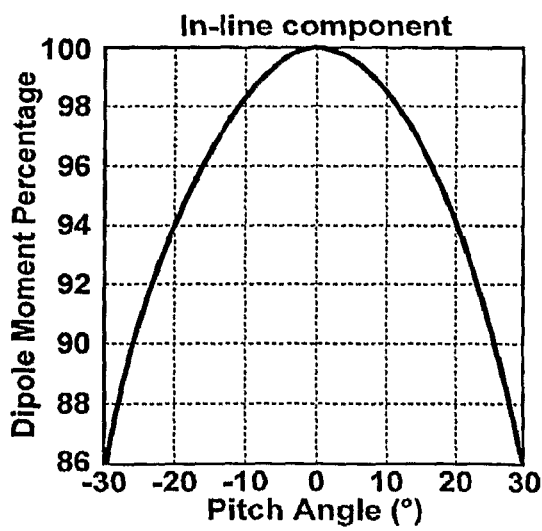

The lateral force provided by a ROV thruster could also be generated by a suitable vane or fin on the head fish or tail drogue. The magnitude of the force generated by a vane is dependent on its speed through the water and its surface area. The vanes must provide a vertical component, although the vane does not have to be totally vertical. FIGS. 15 and 16 illustrate two vane configurations on a towed body 160: a vertical vane 161 and either two horizontal vanes 162 or two inclined vanes 163. The fins are preferably remotely adjustable and capable of swiveling or pivoting. Conventional marine CSEM data is collected at slow acquisition speeds (1.0 to 1.5 knots) to maximize the spatial resolution. Practical considerations may limit the physical size and configuration of the control vanes, including ease of launch and recovery.

The thrusters and vanes may be adjustable in terms of the direction in which they supply a force, but can be nonadjustable: One embodiment is to have thrusters fixed in the horizontal and vertical planes, while another is to use one thruster whose orientation can be remotely adjusted. Similarly with vanes, the control forces can be generated from adjustable or non-adjustable vanes, or a combination of both. Non-adjustable vanes will provide a force in a certain direction, dictated by the vane orientation. The orientation could be pre-set before deployment based on a-priori current information. Vanes that are adjustable in real-time based on a control feedback loop are required to truly steer the dipole along a pre-plot sail line in the presence of seafloor bottom currents (lateral control) and over a seabed with topographic variations (vertical control).

Lateral control means are preferably used at both ends of the streamer, i.e. a lateral control means is installed on the head fish, and another on the tail drogue. Under some sea conditions, the tail drogue lateral control may be considered unnecessary. The main consideration is whether seafloor bottom currents are present. These currents will cause the dipole to yaw behind the head fish. Typically, source data will be acquired under a set of technical specifications for the survey which will state the magnitude of acceptable yaw as well as the across-line distance from the pre-plot sail line. In benign and stable seafloor conditions, the dipole yaw will be minimal or negligible and the dipole will satisfy the technical specifications without independent lateral control at the tail drogue. The across-line distance can be controlled using one set of lateral controls mounted on the head fish or by maneuvering the surface vessel. In variable or high current seafloor regimes, the yaw angle will most probably exceed the threshold in the technical specifications. Under these conditions, it will be necessary to be able to control the lateral position of the tail drogue as well.

Lateral Streamer Control

Figure 12:
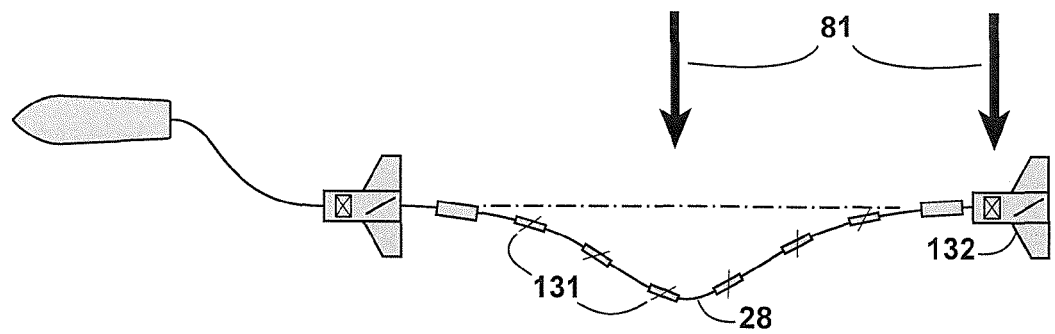
FIG. 12 is a schematic horizontal plan view of a vessel and CSEM dipole showing streamer yaw angle due to seafloor bottom cross current (not to scale)

The lateral control devices discussed above ensure the tail drogue is in line with the head fish along the pre-plot azimuth. In the presence of a seafloor bottom current, the (imaginary) chord between the head fish and tail drogue can thus be made to have zero yaw angle; however, the marine CSEM source streamer can deviate from the pre-plot azimuth, as illustrated in FIG. 12. This is undesirable because a fluctuating distance between the two electrodes means a fluctuating source dipole moment, which is undesirable for purposes of interpreting the survey data. The dipole moment is preferably maintained at its maximum value, which results when the streamer is stretched straight. In the present invention, the streamer deviation can be:

(i) Attenuated during the design process, and/or
(ii) Mitigated by deploying additional hardware.

Both areas are considered below.

I. Design Considerations.

Drag from the tail drogue will tend to straighten the streamer and align it in a line between the head fish and the tail drogue, but turbulence-induced drag on the streamer, caused by seafloor bottom currents, can disrupt the alignment of the streamer. The field of sub-sea cable manufacture includes the capability to design a streamer with minimal or reduced turbulence-induced drag. Available design options include:

(i) A torque-balanced streamer cable can be manufactured with at least two layers of armor wound in opposite directions. Such a torque-balanced streamer would not twist when deployed from the surface vessel. The cross-section can be asymmetrical to minimize the horizontal turbulence.
(ii) Faring material that lowers the drag coefficient by decreasing turbulence.
(iii) Skin material with a low coefficient of friction II. Hardware to Counter the Streamer Deviation.

FIG. 12 shows control vanes 131 mounted on streamer 28 to control the lateral position of the streamer. The dipole profile is the result of a seafloor bottom current 81 which introduces a yaw in the dipole. The tail drogue 132 has compensated for the yaw angle by a vertical vane and/or thruster. The resultant streamer profile will be eliminated by control vanes using a streamer profile estimated by a variety of techniques discussed below. There are several published articles which describe other devices that control the lateral position of sub-sea marine seismic cables including the following.

In U.S. Patent Application Publication No. 2005/0276161, Olivier describes an assembly with one or more wings mounted about pivot axes. The wings are ballasted so that the pivot axes are largely in a vertical plane. Control electronics will adjust the wing angle and provide a lateral force to steer the streamer. The assembly is connected to the streamer through collars that allow the wings to freely rotate about the streamer to maintain their verticality. Olivier describes several methods to ensure the wings are vertical:

(i) "One way to achieve this is to make one of the wings heavier than the other. This can be done, for example, by making the lower wing out of a denser material or installing a weight, such as a lead or tungsten weight, in a void within the wing."
(ii) "The interior of one or both wings can be hollow with a void that is empty or filled with a foam material, such as glass-sphere-filled polyurethane or glass-sphere-filled epoxy, to keep them lightweight without affecting their designed shape."
(iii) "Even as the cable rotates within the connector under tow, the pivot axes of the wings remain largely in a vertical plane."

In PCT Patent Publication WO 98/28636, Bittleston describes a bird assembly that can generate both lateral and vertical forces on a seismic streamer. The assembly includes two wings that are attached to a non-rotating coupler or adaptor built into the streamer. Bittleston describes the assembly as "The bird is provided with two opposed control surfaces, or wings, typically molded from a fiber-reinforced plastics material, which project horizontally outwardly from the body and which are independently rotatable about a common axis extending substantially perpendicularly through the longitudinal axis of the body." Bittleston also notes "The body of the bird does not rotate with respect to the streamer, and thus twists the streamer as it rolls. The streamer resists this twisting motion, so acting as a kind of torsion spring which tends to return the bird to its normal position (i.e. with the wings extending horizontally). However, this spring returning action, though beneficial, is not essential, and the bird can if desired be designed to rotate to a certain extent with respect to the axis of the streamer."

U.S. Pat. No. 6,985,403 to Nicholson proposes a more complex assembly which again can generate both lateral and vertical forces on a seismic streamer. The assembly includes "a control device for controlling the position of a marine streamer comprising; an annular aerofoil, a mount for mounting the annular aerofoil onto and around the streamer; and control means for controlling the tilt and/or rotation of the aerofoil whereby to adjust the lateral position and/or depth of the streamer." Nicholson uses the term annular aerofoil "to include annular rings with varied cross sectional, aerodynamic profiles. These cross sectional shapes may range from a simple oval or elliptical shape to more complex aerofoil designs. The annular aerofoil is mounted about the streamer with its attachment points as near as possible coplanar with its centre of lift, thus minimizing the forces required to control its orientation."

Other methods of providing lateral control of the streamer will occur to persons skilled in the art. All of the hardware devices preferably include control electronics to actuate the various control surfaces and generate lateral forces. It follows that the streamer shape must be continuously estimated in real time to provide inputs to the control electronics. The inputs can be manually entered by an operator, but a more seamless and continuous solution will be provided by electronic "feed back" mechanisms. The real-time network solutions estimated for 3-dimensional seismic networks have spatial resolution in both in-line and across-line components. The streamer shaping estimates for a marine CSEM source are linear, given that only one streamer is towed behind the source. There are several methods available to estimate the shape of a marine CSEM source streamer, including the following, some of which are described in more detail in companion patent application U.S. Provisional Patent Application No. 60/801,888:

(i) USBL (absolute positioning from the surface vessel): Ultra Short BaseLine (USBL) acoustic positioning provides 3-dimensional position estimates through a range plus horizontal and vertical angles relative to the surface vessel's position, orientation and attitude. These data provide absolute 3-dimensional positions of remote subsea transponders which could be deployed at discrete points along the streamer. A curve fit routine (inc. $n^{th}$ order polynomial or spline) can be fitted through these points to estimate the horizontal profile of the streamer. The USBL acoustic positioning system is the only sensor capable of providing absolute position estimates of subsea objects for applications with large spatial extent, i.e. a towed streamer. This technique is normally used for rig and platform related tasks. The majority of USBL systems operate in a medium frequency acoustic band (21 to 32 kHz) which limits the operational range to approximately 4,000 meters depending on transmit power. The source dipole can be tracked in water depths of 3,000 meters using this type of USBL. A medium frequency system deployed on the surface vessel can not position the source dipole in deeper water depths (i.e. 3,000+ meters) or the towed streamer, due to the excessive range. Several configurations which can provide the absolute position estimates of the source dipole and towed streamers of varying lengths in all operational water depths are presented below:

(A) USBL systems that operate in a low frequency acoustic band (8 to 14 kHz) can track transponders to greater distances (maximum ranges are claimed to be in the range 8,000 to 10,000 meters). The increase in slant range will enable short towed streamers (preferably <6,000 meters) to be positioned from the surface vessel (using transducer 196), as illustrated in FIG. 19. LF USBL systems can be used in conjunction with any of the following techniques to position longer towed streamers. FIG. 19 shows the similarities between receiver streamers and HED sources. The source dipole streamer 28 has a head fish 197 and a tail drogue 198. A receiver streamer, if one were to be used in CSEM surveying, would also likely have a head fish 193 and a tail drogue 194. The head fish would contain the mechanical coupling between the tow umbilical and the streamer, and possibly other items such as a swivel and communications equipment, but would be considerably smaller physically than the source counterpart since it does not need to house large power transformers and switching electronics. Acoustic transponders 195 for the USBL system are shown at intervals along the receiver streamer 191 (and at the source's head and tail), along with the receivers 192. A receiver streamer would typically be about 6,000 to 8,000 m in length, much longer than a source dipole, typically 100-300 m. The same vessel is towing both source and receiver streamers.

Figure 20:
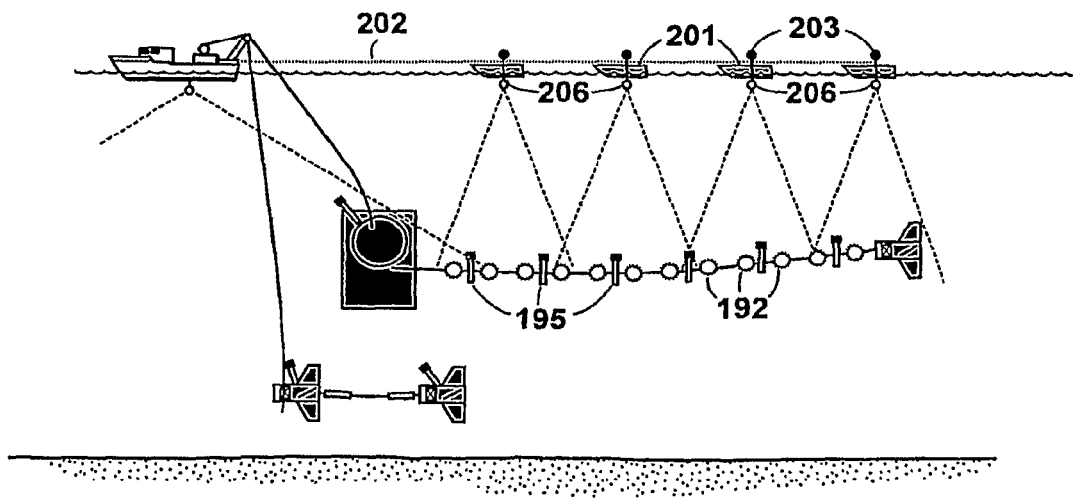
FIG. 20 is a schematic vertical profile of a source dipole and towed receiver streamer with absolute positions estimated using multiple USBL system deployed on surface floats towed behind the vessel (not to scale)
Figure 21:
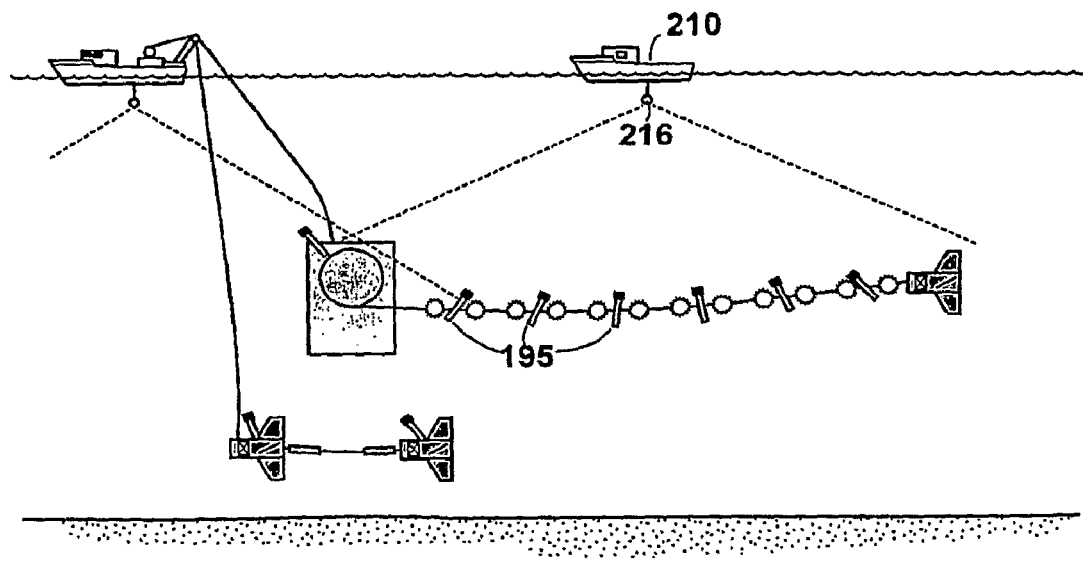
FIG. 21 is a schematic vertical profile of a source dipole and towed receiver streamer with absolute positions estimated from multiple USBL systems deployed on multiple surface vessels (not to scale)

(B) Multiple MF USBL systems can be positioned behind the surface vessel such that the transducer to transponder distance does not exceed the operational maximum. Each USBL transducer needs to be positioned, including absolute 3-dimensional coordinates and attitude (azimuth, pitch and roll). FIG. 20 illustrates multiple USBL systems 206 deployed on surface floats (or buoys) 201 towed behind the surface vessel. The tow umbilical 202 will provide power and communications from the surface vessel. Each float is equipped with a GPS receiver and attitude sensor 203. FIG. 21 illustrates a second USBL system 216 deployed on a second vessel 210, for example the chase or support vessel.

Figure 22:
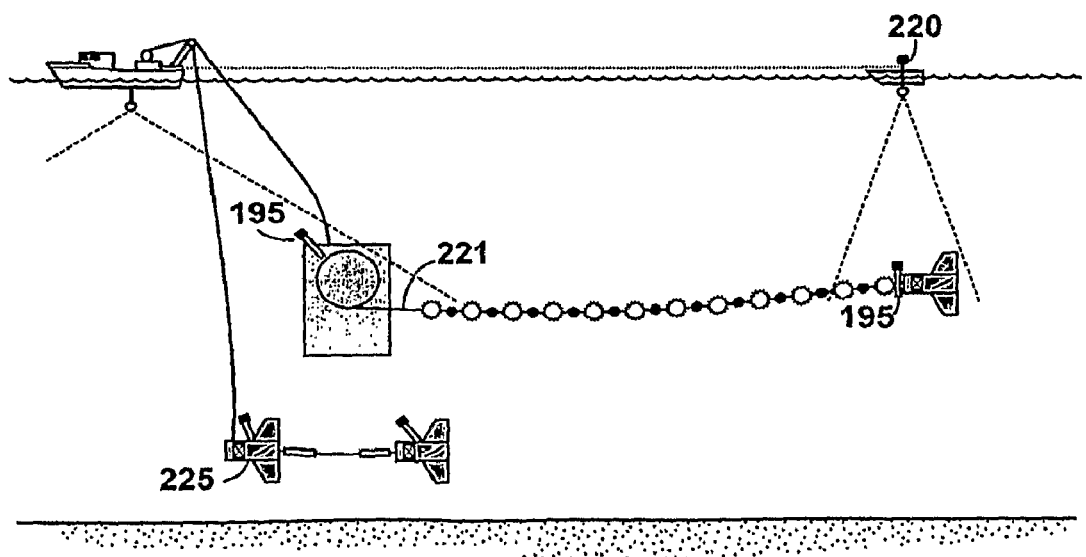
FIG. 22 is a schematic vertical profile of a source dipole and towed receiver streamer with absolute positions estimated at the ends of the towed streamer and a streamer profile estimated by other means (not to scale).

(C) FIG. 22 illustrates a towed streamer with absolute position estimates at the head and tail only, via transponders 195. The tail position is shown as being estimated via a towed surface float 220, but a second surface vessel is equally suitable. The streamer profile between the end points can be estimated using the relative sensors described in the following sections.

(ii) USBL (relative positioning from the CSEM source): The USBL transducer and control electronics can be packaged to withstand the pressures associated with deep tow operations and be mounted (not shown) on the marine CSEM head fish 225. The head fish is instrumented with high quality orientation and attitude sensors for routine head fish positioning. These orientation and attitude observations can be used to remove the local head fish undulations from the USBL observations. The resultant positions will not be absolute, but will be relative to the head fish, which acts as the origin for the streamer profile. Placing the USBL transducer on the head fish will improve the relative precision due to the significantly shorter ray paths.

(iii) Non-magnetic heading sensors: The horizontal profile of the streamer can be estimated by fitting a minimum curvature arc through successive azimuths at discrete points along the length of the streamer. The azimuth estimates can be obtained from a suitable non-magnetic based sensor (not shown), including Fiber Optic Gyrocompasses (FOGs) or Ring Laser Gyrocompasses (RLGs), packaged in a suitable pressure housing complete with power and data communications.

(iv) A fiber-optic solution: U.S. Pat. No. 6,888,623 to Clements describes a flexible "smart cable" which consists of multiple fibers positioned close enough to cause cross-talk (mode coupling) between fibers 221 (see FIG. 22) over the length of the cable. Cross-talk is very sensitive to the distribution of strains caused by either curvature or torsion, which are used to infer the position and attitude of one end of the cable relative to the other. Each fiber is sequentially illuminated by a broadband source. Spectral intensities are measured at different frequencies on all fibers. The local curvature and torsion are estimated along the fibers which in turn allow the horizontal profile to be estimated from the spectral intensity measurements. This embodiment of the invention might include mitigation measures to minimize the effects of instrument noise, systematic biases due to fabrication defects and sensitivity to extrinsic variables including temperature.

v. Fiber-optic bragg gratings: Fiber Bragg Gratings (FBGs) consist of a series of perturbations in the index of refraction along the length of a fiber. A typical grating may be between 1 and 25 mm in length, and the spacing between regions of alternating refractive index may be measured in hundreds of nanometers. The grating reflects a spectral peak based on the grating spacing and wavelength of reflected light. The physics and the analysis are very similar to that for a diffraction grating in a physics textbook. Diffraction gratings and their resulting diffraction patterns are explained by a simple relationship that explains each observed diffraction peak by relating the grating "slit" spacing, the order of the peak, the angle of diffraction, and the wavelength of the light causing that peak. For the diffraction grating, the slit spacing is a known constant quantity. For the present application, the flexing of the streamer and consequent flexing of the optical fibers changes grating dimensions that correspond to slit spacing, which become the unknowns in the calculation while the source frequency remains constant. (The optical fiber applications of the present invention utilize reflection patterns, not diffraction patterns.) The shape of the streamer can be estimated from the change in grating dimensions. Quantitative strain measurements can be made by measuring the center wavelength of the reflected spectral peak (W. L. Schutz, J. P. Conte, E. Udd, "Long Gage Fiber Optic Bragg Grating Strain Sensors to Monitor Civil Structure," Proceedings, SPIE 4330, 56-65, *Smart Structures and Materials* 2001: *Smart Systems for Bridges, Structures, and Highways*; Ed. Liu, S. C. (2001)). A commercial Fiber Optic Bragg Gratings strain measuring product is the Distributed Sensing System (DSS) marketed by Luna Innovations, 10 South Jefferson Street, Roanoke, Va. 24011. A commercial source of Fiber Bragg grating sensors complete with a rugged housing to protect from the physical and environmental harm is Advanced Engineering Development Program (AEDP), 4865 Walden Lane, Lanham, Md. 20706. AEDP have deployed Fiber Bragg grating on a submarine hull exterior for vehicle certification.

Multiple Fiber Bragg Gratings can be constructed over the length of a single fiber. The gratings can be interrogated using either Wavelength Division Multiplexing (WDM) or Optical Frequency-Domain Reflectometry (OFDR) to provide multiple spectra along a single fiber. OFDR can estimate spectra at a higher spatial density and to a higher resolution. As stated previously, Fiber Bragg Gratings have been used in civil and structural engineering applications. The equipment for such applications will need repackaging for sub-sea pressure vessels before being usable in the present invention, but this should be straightforward.

As stated above, multiple FBGs can be deployed along a single fiber to detect strains at multiple points along that fiber, using a suitable multiplexing scheme. A single fiber can detect strains caused by the streamer flexing. To estimate the shape of the horizontal streamer, multiple fibers can be arranged on different faces or edges of the streamer (i.e. top, bottom, left and right). A configuration of multiple fibers assembled in a single fiber is disclosed in "Sensing Shape," by Roger Duncan, Published in the September 2005 edition of OE Magazine (The SPIE magazine of Photonics Technologies and Applications), 17 Old Nashua Rd., Suite 25, Amherst, N.H. 03031. The "Sensing Shape" article describes tests where the cable was positioned into circles, sinusoids plus sharp and gradual curves. Application in the present invention will result in gradual curves only. The quoted positioning error is $\approx$1.2% of the total cable length for all shapes. Over a streamer length of 300 meters, this results in an error of 3.6 meters. If a worst case is assumed in which the error is perpendicular to the streamer, the error will be an angular error of 0.68° over the length of a streamer. This technology would need to be housed inside a pressure vessel/housing suitable for deep water operation. A central control unit would supply power, data storage and control for several cables along a steamer.

vi. Electromagnetic solutions: Electric and/or magnetic sensors could also be used to detect non-linear streamers. The current flowing through the streamer to the far electrode will generate electric and magnetic fields. All conventional CSEM surveys will be designed with the streamer in a horizontal plane and straight heading along a pre-plot line azimuth. The following sensor combinations, mounted on either the head fish or tail drogue, will observe null or zero fields when the streamer is in its design configuration:

(1) Electric field sensor mounted across-line (perpendicular to the pre-plot line azimuth in the horizontal plane);
(2) Electric field sensor mounted in the vertical plane;
(3) Magnetic field sensor mounted in the in-line direction.

Any or all of these sensors could be used to detect an out of plane streamer. The sensors would not provide an estimate of the streamer profile. Instead the control vanes would be adjusted, and the electric or magnetic sensors would measure the resultant field strengths. The control vanes and sensors would be used in an iterative approach until the streamer is sufficiently straight and the sensor observations fall below a user specified threshold.

After the instantaneous horizontal streamer profile has been estimated, the local azimuth at the location of each control vane can be estimated using the nominal inline offsets of the control vane and the streamer profile. The azimuth deviation at each control vanes can be determined from the local azimuth and the nominal pre-plot line azimuth, and forms an input to the control vane electronics.

Some of the above-described sensors are obviously also suitable for determining the instantaneous location of each electrode, when mounted on or near the electrode. The steering capabilities of the invention are incomplete without some knowledge of whether the dipole is outside the desired orientation, in what direction, and by how much, For example, from sensor information on the location of the electrodes, it can be determined whether the dipole azimuth is aligned with the source tow line, and whether both electrodes are at the same desired elevation. This, in turn, indicates whether steering is needed and in what direction. In preferred embodiments of the invention, the position locating sensors include at least some non-acoustic sensors, because acoustic sensors are limited in the precision of their measurements. In such embodiments, the acoustic sensors provide absolute position estimates. Even though these estimates may not be considered precise enough for some applications, due to range limitations, they can be augmented with other sensors (e.g., Doppler Velocity Log (DVL) or Inertial Measurement Unit (IMU)) to improve the achievable precision.

Vertical Head Fish Control

Figure 13:
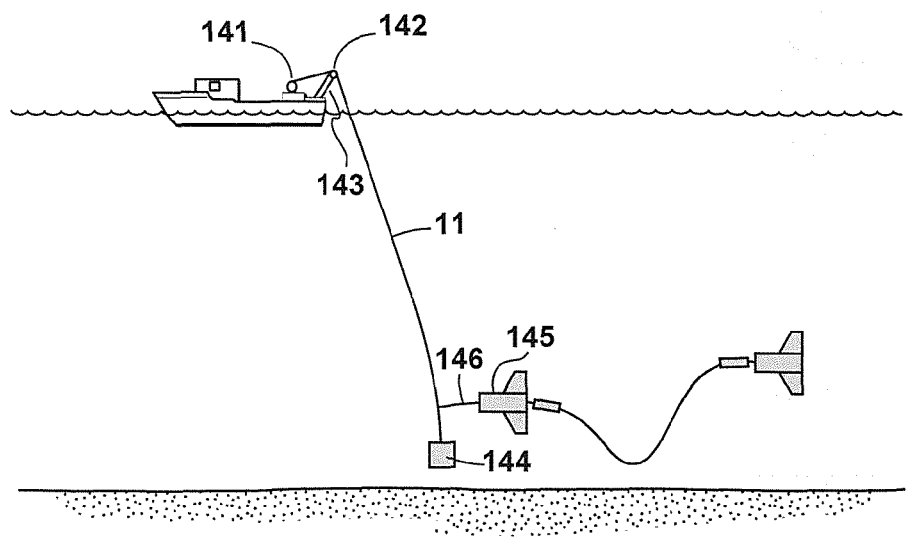
FIG. 13 is a schematic vertical profile of a tow vessel and CSEM dipole using a depressor weight to de-couple the head fish from the vessel's vertical motion (not to scale)
Figure 14:
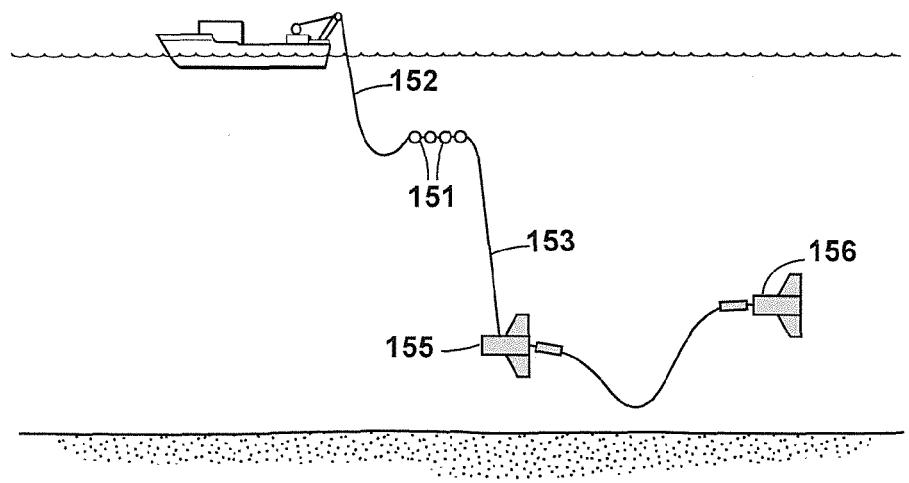
FIG. 14 is a schematic vertical profile of a tow vessel and CSEM dipole using intermediate buoyancy to de-couple the head fish from the vessel's vertical motion (not to scale)

The vertical motion of the head fish can be de-coupled from the heave of the surface vessel by incorporating a depressor weight, as described by Wu and Chwang and illustrated in FIG. 13. Their analysis indicated the heave de-coupling is dependent on the secondary cable length, between the tow umbilical and the head fish. The length of the secondary cable can be adjusted as follows. In areas of constant water depth and constant surface waves (sea state) the cable length can be set manually. In areas of variable water depth or fluctuating surface waves (sea state) the cable length can be adjusted remotely through a winch on the head fish.

The vertical amplitude of the head fish 155 oscillation relative to the vessel heave can be reduced through use of an intermediate buoy system, as show in FIG. 15. The buoyancy modules 151 act to decrease effective tension on the cable length above the buoys, thus causing that cable section to "lay back" further from the vessel than normal, thus reducing the oscillation amplitude. This works as follows. Sufficient cable is paid out at the tow vessel to generate a sag in the upper segment 152 of the tow umbilical cable. The buoyancy of the intermediate buoy 151 will cause the second segment 153 of the tow umbilical to be fairly taut. Any surface vessel heave will be absorbed by the sag and not be transmitted below the intermediate buoy.

Overall, any increase in the ratio of cable length deployed to the actual straight line distance between vessel and head fish will have the effect of reducing the head fish oscillations. Increased catenary length, depressor weights, intermediate buoy systems, or a combination of these designs all achieve this result in various embodiments of the present invention.

The tail drogue 156, like the streamer but unlike the very heavy head fish, is nominally neutrally buoyant. As such, the tail drogue will exhibit a damped response to any variations in the head fish's vertical position. Vertical control of the streamer and the tail drogue will reduce the response time to any vertical variation and help maintain the dipole in a horizontal attitude.

Vertical Streamer Control

Figure 9:
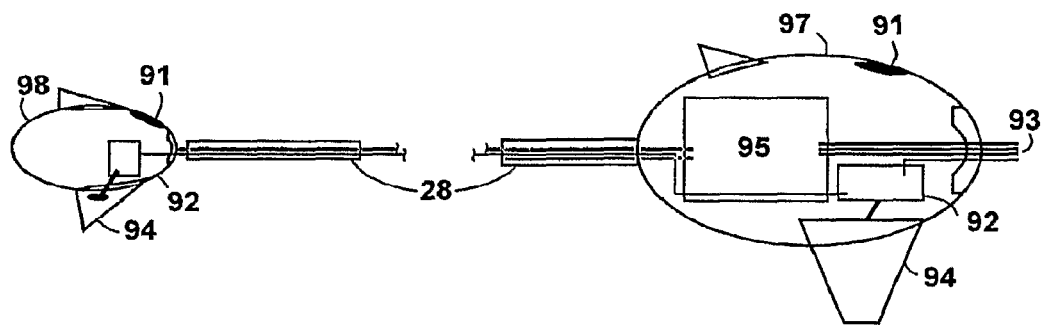
FIG. 9 shows a possible HED source design containing some features of the present invention (not to scale)
Figure 10:
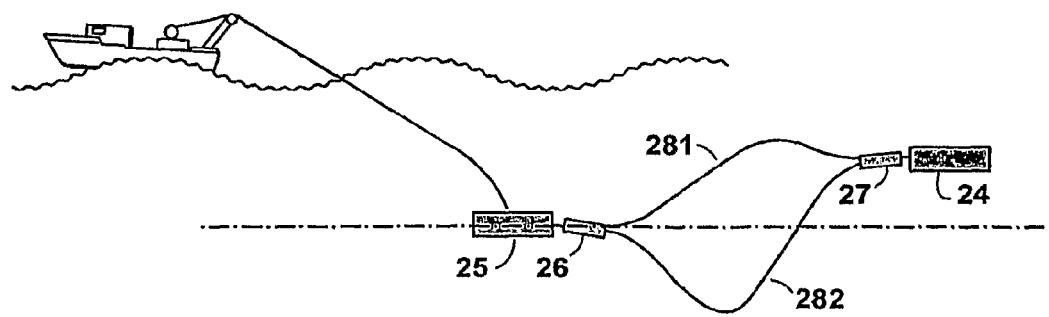
FIG. 10 is a schematic vertical profile of a dipole illustrating bow and sag (not to scale)

FIG. 9 contains an illustration of a conceptual deep tow high power EM source array. The conceptual design includes the use of a neutrally buoyant streamer 28 plus horizontal control surfaces 94 on both the head fish 97 and tail drogue 98. The control surfaces on the head fish would provide altitude control at the front of the streamer and eliminate, or assist, the winch operator's input on the surface vessel. The control surfaces on the tail drogue will reduce any residual pitch angle caused by cumulative second order buoyancy variations previously discussed. In this design, acoustic transponders 91 provide pitch angle feedback to units 92 that control surfaces 94. A power waveform synthesizer is housed in a pressure case 95 and is driven by power lines 93 housed within the tow umbilical (not shown) and in turn provides current at the desired source waveform to the electrodes (not shown). Second order buoyancy variations cause the streamer to "bow" (upwards) 281 or "sag" (downwards) 282 when the specific gravity of the flotation is <1.0 or >1.0 respectively depending on the operational water depth, as illustrated in FIG. 10. The streamer shape and altitude are further affected by the addition of discrete bodies (not shown) on the streamer, typically electrical termination blocks, electrodes or acoustic positioning transponders. The flotation needed to compensate for these additional "point weights" introduces additional second order buoyancy variations. Variations in the dipole's vertical profile will add to the complexity of data processing.

Figure 11:
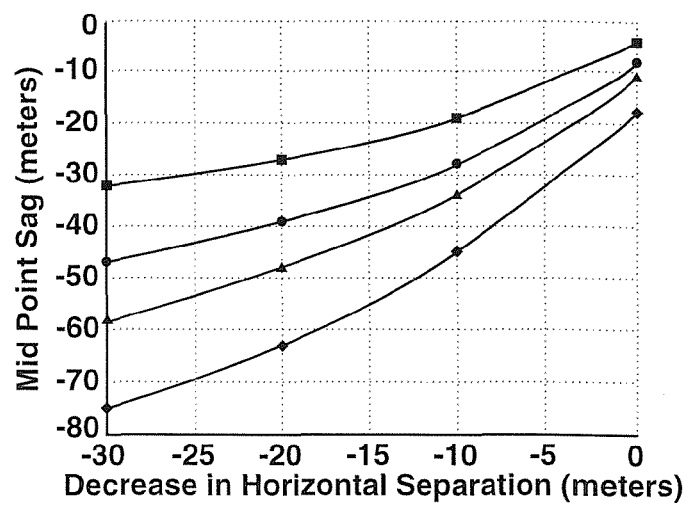
FIG. 11 is a graph showing catenary sag generated by a linear buoyancy misfit along the entire length of a marine CSEM source streamer.

Sags or bows in the vertical streamer profile will shorten the dipole length and hence reduce the dipole moment [dipole moment (Am)=dipole length (m)*transmitted current (A)]. FIG. 11 illustrates a simple catenary model which assumes a constant buoyancy misfit along the entire streamer length. The drawing illustrates the relationship between the midpoint sag and the decrease in horizontal end point separation due to the sag, for streamer lengths ranging from 100 m (top curve) to (progressing downward in the drawing) 200 m, 300 m, and 500 m. The end points, i.e., the head fish and the tail drogue, are assumed to be maintained at the same depth for FIG. 11. Further, if the buoyancy does not fully compensate for the masses involved, the resultant sag could physically impact the seafloor or existing infrastructure. The effect of buoyancy discrepancies will result in much greater catenary sag in a towed streamer due to its greater length (nominally 5,000 to 10,000+ meters). A tail drogue implementation with horizontal control surfaces only can not compensate for streamer sag caused by the second order buoyancy variations.

Several methods may be adopted to control the vertical profile of the marine CSEM source dipole, in addition to those methods discussed above under horizontal streamer control that also give vertical control. The methods can be used individually or someone skilled in the art of sub-sea engineering can design an optimal combination of some or all of the methods.

(i) U.S. Pat. No. 4,745,583 to Motal describes a marine cable with automatic buoyancy control based on a self-contained low pressure medium (fluid or gas). The medium is pumped between a reservoir and bladder located inside the cable, which would be the dipole streamer in the present invention. The density and buoyancy of each cable section is controlled by varying the medium volume in the bladder. Motal includes examples of a cable having an elastic outer surface using an incompressible medium and a cable with bladders built inside a cable with a rigid skin. Depth sensors are deployed along the cable, preferably with one depth sensor per cable section or bladder. The depth sensors provide input into a feedback control loop which pumps the buoyant medium between the reservoir and cable section to maintain the required depth. In a marine CSEM data acquisition application, the desired cable depth can vary and follow the depth of the head fish, thereby maintaining a horizontal source dipole, as the head fish maintains a constant altitude above the seafloor. The reservoir can be located at any suitable location, provided it does not cause any depth irregularities itself. A preferred location for marine CSEM applications would be the head fish.

(ii) U.S. Pat. No. 6,533,627 to Ambs describes another method of dynamic buoyancy control for marine seismic streamers, with electro active polymers (EAPs) acting as the buoyancy medium. Ambs states, "The preferred general class of materials that change their volume (or shape) in response to electrical stimuli are referred to as electro active polymers or EAPs. These EAP materials change shape in response to an applied electric or magnetic field, light, pH, and/or stress. This general class of EAP materials can be subdivided into several types of material, comprising gels, ionic polymer metal composites, conductive polymers, and electrostrictive polymers. Gels can change volume by a factor of up to 1000 and conductive polymers can change volume by a factor of about 2 under electric control". An EAP has a distinct advantage over a fluid filled bladder in that "Use of an EAP material in a towed seismic streamer enables a towed array to become positively buoyant when electric power is turned off or lost when the towed array is severed from electric power". Ambs describes a preferred embodiment that "operates in water depths of between 0 and 300 meters. The preferred EAP is capable of changing the density of a towed streamer array between maximum and minimum density in less than two minutes". Ambs also states the bulk density can be "electrically altered to accomplish neutral buoyancy for a towed array of streamers within the full range of water-densities from fresh to extremely dense seawater". Ambs shares several common aspects with Motal including the use of sensors (temperature, depth and salinity) that act as inputs to a feedback control mechanism.

(iii) U.S. Pat. No. 3,931,608 to Cole describes an apparatus (commonly referred to as a "bird") which controls the depth of seismic streamers. The bird is equipped with two wings, or fins, which are maintained in a horizontal plane by suitable ballasting of a control body, which is free to rotate around the streamer. The fins operate in unison, whereby both fins tilt upward or downward simultaneously. The apparatus was equipped with "force comparator which compares the force of ambient water pressure at the depth at which the cable is operating with a reference force representing the desired cable depth, a control body for containing the comparator, and plural diving planes which respond to the comparator and move the cable to the desired depth". This design can be enhanced to include additional control sensors and electronics such that the reference force can be adjusted as the head fish's altitude changes. Cole's invention was designed to operate on seismic streamers with shallow (0 to 100 meter) depth rating. The design can be enhanced to operate in the deeper water depths associated with marine CSEM data acquisition (100 to 3,500 meters).

A steerable source according to the present invention could, for example, include some or all of the following features (among other possible features):

(a) Construct the streamer using a double-armored torque-balanced design and include an asymmetrical outer jacket plus faring to reduce lateral drag in the presence of a seafloor bottom current.

(b) Construct the streamer using an Electro active Polymer (EAP) to maintain a neutral buoyancy. The EAP will return to a default state of positive buoyancy if the control signal is lost.

(c) Equip the streamer with a fiber optic solution to estimate the streamer's position in both the horizontal and vertical planes.

(d) Mount adjustable vertical vanes on the streamer to control the lateral position of the streamer relative to the head fish and tail drogue.

(e) Equip both the head fish and tail drogue bodies with adjustable thrusters to maneuver the body horizontally and vertically. The thrusters will ensure the body can maintain the appropriate altitude and remain on the pre-plot sail line at the design azimuth.

(f) Include control electronics, which in conjunction with the appropriate sensors and control elements, will control feedback loops to keep the streamer in its desired orientation. The control electronics can be mounted either on the surface vessel, on the head fish or other suitable body. Fiber communications will transfer the appropriate data between the electronics, sensors and control elements.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A steerable horizontal electric dipole source system for underwater deployment as a moving source in electromagnetic surveying of subsurface regions for hydrocarbons, comprising:
   (a) a head electrode and a tail electrode, connected by a flexible streamer to form a dipole, said head electrode being adapted to connect to a tow cable, said electrodes being made of an electrically conducting material;
   (b) a first lateral control means for changing position of the head electrode in a lateral (horizontal) plane when the source is submerged in water;
   (c) a vertical control means adapted to decouple the head electrode from tow cable force variations when the source is submerged in water;
   (d) a position-locating sensor located near the head electrode, adapted to determine instantaneous position of the head electrode; and
   (e) control electronics and electrical connections between the position-locating sensor and the first lateral control means, such that the first lateral control means are adjustable in real time based on the instantaneous position of the head electrode.

2. The steerable dipole source system of claim 1, further comprising a second lateral control means for changing position of the tail electrode in a lateral (horizontal) plane when the source is submerged in water, and a position-locating sensor located near the tail electrode and adapted to determine instantaneous position of the tail electrode, and electrical connections between the position-locating sensor located near the tail electrode and the second lateral control means such that the second lateral control means are adjustable in real time based on the instantaneous position of the tail electrode.

3. The steerable dipole source system of claim 2, further comprising: a head fish connected to the head electrode and providing the adaptation for connection to the tow cable; and a neutrally buoyant, tail drogue connected to the tail electrode.

4. The steerable dipole source system of claim 3, wherein the head fish contains a sub-sea electrical power transformer and control electronics electrically connected to the head and tail electrodes, and is adapted to be electrically connected to an external electrical power source.

5. The steerable dipole source system of claim 3, wherein the first lateral control means is located in the head fish and the second lateral control means is located in the tail drogue.

6. The steerable dipole source system of claim 1, wherein the streamer is neutrally buoyant in water, over a pre-determined range of water depths.

7. The steerable dipole source system of claim 2, wherein each lateral control means is at least one of a group consisting of (a) thrusters; (b) control vanes; and (c) means for increasing drag when submerged in water.

8. The steerable dipole source system of claim 2, further comprising steering control electronics, electrically connected to the sensors and each lateral control means, and adapted to cause the lateral control means to move the dipole toward a pre-selected orientation when towed submerged in water.

9. The steerable dipole source system of claim 3, wherein the vertical control means is a depressor weight attachable to the tow cable.

10. The steerable dipole source system of claim 3, wherein the tow cable adapted to be attached at one end to the head fish, wherein the vertical control means is a buoyant object attachable between the cable's end points.

11. The steerable dipole source system of claim 3, wherein the vertical control means is a heave motion compensation winch system adapted to be mounted on a tow vessel, and the tow cable adapted to be attached at one end to the head fish and at the other end to the winch system.

12. The steerable dipole source system of claim 1, wherein said streamer is designed to reduce turbulence-induced drag in water in the presence of any seafloor bottom current with a component lateral to a pre-selected source line azimuth.

13. The steerable dipole source system of claim 1, wherein the streamer is constructed to include at least one of a group consisting of (a) at least two layers of armor, wound in opposite directions in a torque-balanced design, wherein the streamer has an asymmetrical cross-section reducing lateral drag; (b) a faring designed to reduce turbulence when towed submerged in water; and (c) an outer skin material selected for low coefficient of friction in water.

14. The steerable dipole source system of claim 1, wherein the streamer includes a plurality of position-locating sensors distributed along its length, and lateral control means for generating lateral forces in water to control the streamer's shape when submerged in water.

15. The steerable dipole source system of claim 14, further comprising control electronics electrically connected to the streamer's position-locating sensors and its lateral control means.

16. The steerable dipole source system of claim 15, wherein the streamer's control electronics are adapted to make automatic control changes to the streamer's lateral control means based on feedback from the streamer's position-locating sensors.

17. The steerable dipole source system of claim 14, wherein the streamer's position-locating sensors are in fiber optic strands extending the length of the streamer.

18. The steerable dipole source system of claim 1, wherein the streamer includes vertical control means for generating vertical forces in water to control the streamer's shape when submerged in water, and a plurality of depth sensors distributed along its length.

19. The steerable dipole source system of claim 18, further comprising control electronics electrically connected to the streamer's depth sensors and its vertical control means.

20. The steerable dipole source system of claim 19, wherein the streamer's control electronics make automatic control changes to the streamer's vertical control means based on feedback from the streamer's depth sensors.

21. The steerable dipole source system of claim 18, wherein the vertical control means is built-in variable buoyancy along the length of the streamer.

22. The steerable dipole source system of claim 18, wherein the vertical control means is a bird attachable to the streamer and having two fins ballasted to remain in a horizontal plane when submerged in water, the fins being adjustable to generate an upward or downward force when submerged in water.

23. The steerable dipole source system of claim 1, further comprising a vertical control means for changing the vertical position of the tail electrode when the dipole is submerged in water.

24. A steerable receiver streamer system for marine surveys of subsurface regions for hydrocarbons, comprising:
    (a) a head unit and a tail unit, connected by a flexible streamer, said head unit being adapted to connect to a tow cable;
    (b) a plurality of receivers, spaced at intervals along the streamer;
    (c) a first lateral control means for changing position in a lateral (horizontal) plane when the streamer is submerged in water, located at the head unit;
    (d) a vertical control means adapted to decouple the head unit from tow cable force variations when the streamer is submerged in water;
    (e) at least one position-locating sensor, one sensor being located, at the head unit, adapted to determine instantaneous position; and
    (f) control electronics and electrical connections between the at least one position-locating sensor and the first lateral control means.

25. The steerable receiver streamer system of claim 24, further comprising a second lateral control means for changing position in a lateral (horizontal) plane when the streamer is submerged in water, said second lateral control means located at the tail unit, and a position-locating sensor located at the tail unit.

26. The steerable receiver streamer system of claim 24, wherein the receivers are seismic receivers.

27. The steerable receiver streamer system of claim 24, wherein the receivers are electric field receivers.

28. The steerable receiver streamer system of claim 24, wherein the streamer is neutrally buoyant in water, over a pre-determined range of water depths.

29. The steerable receiver streamer system of claim 25, wherein each lateral control means is at least one of a group consisting of (a) thrusters; (b) control vanes; and (c) means for increasing drag when submerged in water.

30. The steerable receiver streamer system of claim 24, wherein the vertical control means is a depressor weight attachable to a tow cable.

31. The steerable receiver streamer system of claim 24, wherein the tow cable adapted to be attached at one end to the head unit, wherein the vertical control means is a buoyant object attachable between the cable's end points.

32. The steerable receiver streamer system of claim 24, wherein the vertical control means is a heave motion compensation winch system adapted to be mounted on a tow vessel, and the tow cable adapted to be attached at one end to the head unit and at the other end to the winch system.

33. A method for producing hydrocarbons from an underwater subsurface region, comprising:
    (a) performing a controlled-source electromagnetic survey of the subsurface region, wherein a steerable horizontal electric dipole source system is towed underwater above the subsurface region, said steerable dipole source system comprising:

(i) a head electrode and a tail electrode, connected by a flexible streamer to form a dipole, said head electrode being adapted to connect to a tow cable, said electrodes being made of an electrically conducting material;

(ii) a first and second lateral control means for changing position of the head electrode and tail electrode, respectively, in a lateral (horizontal) plane when the source is submerged in water;

(iii) a vertical control means adapted to decouple the head electrode from tow cable force variations when the source is submerged in water;

(iv) two position-locating sensors, one located near the head electrode and the other located near the tail electrode, each adapted to determine instantaneous position of its respective electrode; and (v) control electronics and electrical connections between the position-locating sensors and the lateral control means, such that each lateral control means are adjustable in real time based on the instantaneous position of its respective electrode;

(b) using the first and second lateral control means during the survey to maintain the i electrodes positioned over a pre-determined source tow line;

(c) using the vertical control means during the survey to maintain the head electrode at a pre-determined constant elevation above the water bottom;

(d) obtaining analyses of electromagnetic field data obtained in the survey, said analyses indicating potentially hydrocarbon-bearing structures in the subsurface region below the water bottom;

(e) drilling at least one well into such a structure; and (f) producing hydrocarbons from the well.

34. The steerable dipole source system of claim 9, wherein the tow cable attachable to the depressor weight and a secondary cable attachable at one end to the head fish and to the tow cable at the other end.

35. The steerable receiver streamer system of claim 30, wherein the tow cable attachable to the depressor weight and a secondary cable attachable at one end to the head unit and at the other end to the tow cable.

* * * * *